(12) United States Patent
Chien et al.

(10) Patent No.: US 9,169,842 B2
(45) Date of Patent: Oct. 27, 2015

(54) PERMANENT MAGNET CANNED MOTOR PUMP WITH CORROSION-PROTECTION HOUSING

(71) Applicant: ASSOMA INC., Taoyuan County (TW)

(72) Inventors: Huan-Jan Chien, Hsinchu County (TW); Chin-Cheng Wang, Yilan County (TW); Chih-Hsien Shih, Taoyuan County (TW); Chih-Kuan Shih, Taoyuan County (TW)

(73) Assignee: ASSOMA INC., Taoyuan County (TW)

( * ) Notice: Subject to any disclaimer, the term of this patent is extended or adjusted under 35 U.S.C. 154(b) by 244 days.

(21) Appl. No.: 13/657,586

(22) Filed: Oct. 22, 2012

(65) Prior Publication Data

US 2013/0115118 A1    May 9, 2013

(30) Foreign Application Priority Data

Nov. 7, 2011    (TW) .............................. 100140554 A (51) Int. Cl.
*F04D 13/06* (2006.01)
*H02K 5/10* (2006.01)
(Continued)

(52) U.S. Cl.
CPC ........ *F04D 13/0626* (2013.01); *F04D 13/0633* (2013.01); *F04D 29/026* (2013.01); *F04D 29/5806* (2013.01); *H02K 5/10* (2013.01); *H02K 5/128* (2013.01); *H02K 5/1672* (2013.01); *H02K 5/18* (2013.01); *H02K 5/225* (2013.01); *H02K 7/14* (2013.01); *F04D 29/0465* (2013.01); *F04D 29/588* (2013.01)

(58) Field of Classification Search
CPC ........... F04D 13/0626; F04D 13/0633; F04D 29/026; F04D 29/588; F04D 29/0465; H02K 5/1672; H02K 5/128; H02K 5/18; H02K 5/225; H02K 5/10; H02K 7/14
USPC ......... 417/357, 423.7, 423.12, 423.14, 423.8, 417/366
See application file for complete search history.

(56) References Cited

U.S. PATENT DOCUMENTS 4,850,818 A * 7/1989 Kotera .......................... 417/366
4,997,342 A * 3/1991 Conger, IV ................ 415/214.1
5,156,535 A * 10/1992 Budris et al. ................ 417/423.7

(Continued)

FOREIGN PATENT DOCUMENTS

TW          M369391 U1    11/2009

*Primary Examiner* — Justin Jonaitis
*Assistant Examiner* — Stephen Mick
(74) *Attorney, Agent, or Firm* — Locke Lord LLP; Tim Tingkang Xia, Esq.

(57) ABSTRACT

A permanent magnet canned motor pump features in its corrosion-protection housing which comprises a reinforced bracket, motor casing and a motor rear casing. The reinforced bracket is made of corrosion-resistance plastic and the motor casing and the motor rear casing are made of aluminum alloy. Accordingly, the corrosion-protection housing is capable of preventing the corrosion of the chemical liquid to the aluminum alloy components. Beside, the permanent magnet canned motor pump provides a heat dissipation mechanism while meeting the structural need of the corrosion-protection housing, so that the motor can dissipate heat in a sufficient rate.

12 Claims, 6 Drawing Sheets

(51) Int. Cl.
*H02K 5/128* (2006.01)
*H02K 5/167* (2006.01)
*H02K 5/18* (2006.01)
*H02K 5/22* (2006.01)
*H02K 7/14* (2006.01)
*F04D 29/02* (2006.01)
*F04D 29/58* (2006.01)
*F04D 29/046* (2006.01)

(56) References Cited

U.S. PATENT DOCUMENTS

| | | | | |
|---|---|---|---|---|
| 7,249,939 | B2 * | 7/2007 | Yanagihara et al. | 417/420 |
| 2004/0037719 | A1 * | 2/2004 | Sunaga et al. | 417/423.8 |
| 2010/0272592 | A1 * | 10/2010 | Chien et al. | 417/423.7 |

* cited by examiner

PERMANENT MAGNET CANNED MOTOR PUMP WITH CORROSION-PROTECTION HOUSING

CROSS-REFERENCE TO RELATED APPLICATIONS

This non-provisional application claims priority under 35 U.S.C. §119(a) on Patent Application No(s). 100140554 filed in Taiwan, R.O.C. on Nov. 7, 2011, the entire contents of which are hereby incorporated by reference.

BACKGROUND OF THE INVENTION

1. Technical Field

One of the sealless pumps is the permanent magnet canned motor pump, a device in which motor and pump are integrated as a complete unit, and an windings stator is isolated by corrosion-resistance containment shell, and an encapsulated inner rotor is directly in contact with the liquid to be transferred; another one is the magnetic pump driven by an induction motor, the sealless function is using a magnetic coupling to replace a mechanical seal; therefore, the sealless pump could meet the zero leakage requirement in industries, especially in high temperature, toxic, flammable and corrosive liquid transferred application. The invention focuses on a permanent magnet canned motor pump with a corrosion-protection housing, the corrosion-protection housing is comprised of an aluminum alloy motor casing, an aluminum alloy motor rear casing and a corrosion resistance plastic reinforced bracket, therefore, it will not damage the parts of the pump, even if there are some external chemical droplets dropping on the corrosion-protection housing, such as chemical liquid in the PCB manufacturing processes. The invention is also good for using in the filter tank system, the permanent magnet canned motor pump is installed under the filter tank, and is used to pressurize chemical liquid, so that while the filter is replaced, the problem of chemical liquid dropping on and corroding components of the motor of the pump is prevented. The plastic reinforced bracket is fixed on the pump casing of the pump, and thus keeping zero leakage on the sealing surface. Owing to the plastic reinforced bracket, the heat dissipating capacity of the outer surface of the aluminum alloy motor casing is limited. Accordingly, another object of the invention is providing a new heat dissipation mechanism to dissipate the heat generated by the motor at a sufficient rate.

2. Related Art

The permanent magnet canned pump is a device that integrates a motor and a pump, in tradition the permanent magnet canned pump has an outer shell comprised of an aluminum alloy motor casing with windings stator and an aluminum alloy motor rear casing, thereafter, called motor casing and motor rear casing respectively. Those components of the outer shell have cooling fins for providing sufficient heat dissipation capability, and with corrosion resistance material coating, (e.g. fluor-resin) for the operation in the environment in which corrosive drops may drop on. However, the performance of this solution for long term operation cannot resist corrosion well. Specifically, in the filter tank system used for filtering the chemical liquid, when the permanent magnet canned motor pump is installed under the tank used to pump chemical liquid, after a period of operation the cartridge filter inside the tank needed to take out and change the new, at this condition some chemical droplets may directly drop on the outer shell. And the capability of the outer shell for resisting the corrosive chemical liquid should be improved. One solution for improving the ability of the outer shell for resisting the corrosive liquid is that a motor guard made of corrosion-resistance plastic is placed on the permanent magnet canned motor pump. However, the motor guard is confined by the arrangement of the pipe lines, for example, the length of the motor guard is short and limited, and therefore, the metal parts exposed from the motor guard will suffer from the corrosion droplets of the chemical liquid.

The invention is focused on a corrosion-protection housing of the permanent magnet canned pump, in which the corrosion resistance plastic reinforced bracket protects an aluminum alloy motor casing, an aluminum alloy motor rear casing. In addition, the invention also provides a new heat dissipation mechanism for sufficiently dissipating heat that generated by the motor.

The followings are a conventional permanent magnet canned motor pump and a conventional magnetic drive pump, and none of them provide any effective solution to the chemical liquid droplet corrosion.

Taiwan Patent No. TWM369391 (hereinafter referred to as '391) which is issued in 2009 discloses an improved permanent magnet canned motor pump capable of operating at high temperature and resisting chemical corrosion.

This solution is focused on the shaft stiffness improvement of the pump, one of the features is a high stiffness cantilever stationary shaft of the motor, and the motor with a radial magnetic gap, too. Owing to the application, the encapsulation thickness in the '391 a 3 mm corrosion tolerance must be considered. That is the total width of the magnetic gap is at least 8 mm. The rigid composite stationary shaft is used to satisfy the working conditions are high temperature and high power requirements. The '391 shows that the structure of the permanent magnet canned motor pump of '391 is more concise than magnetic drive pump, since a magnetic coupler and an induction motor are replaced by a canned motor. As a result, the permanent magnet canned motor pump is more suitable for being installed in equipment which the size is limited. However, the '391 does not provide any solution to the problem of the corrosion caused by the dropped corrosive chemical liquid.

Figure 1:
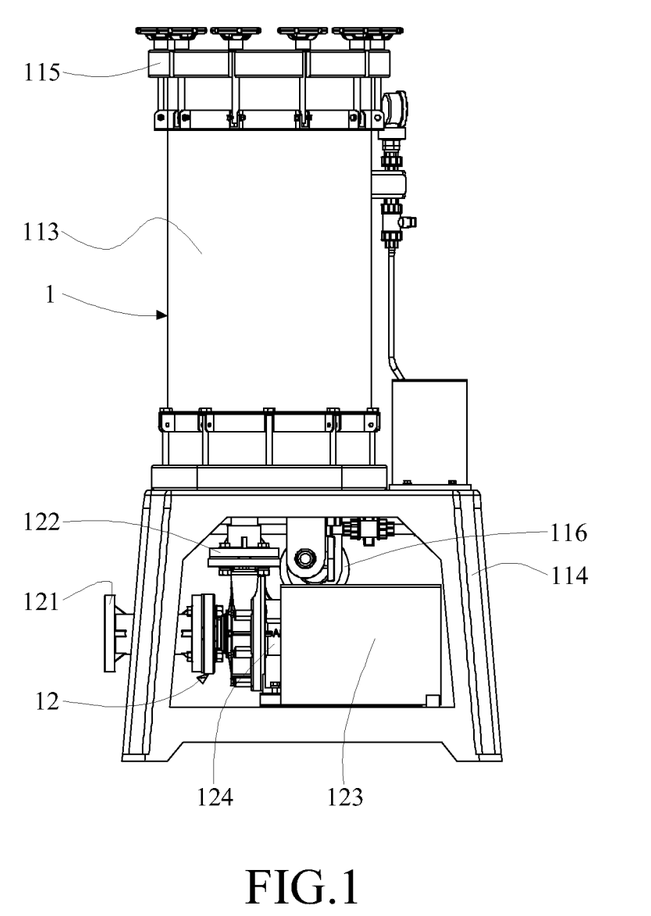
FIG. 1 is a conventional filter system used for manufacturing PCBs.

Another solution for the conventional filter tank system, please refer to FIG. 1, which is used for manufacturing printed circuit boards (PCB). The filter tank system 1 consists of a magnetic drive pump 12, a main frame 114 and a filter chamber 113. The magnetic drive pump 12 is assembled to the main frame 114, an inlet pipe 121 is connected to a tank of a PCB manufacture device, wherein the tank is used to contain chemical liquid; an outlet pipe 122 is connected to an inlet of the filter chamber 113 for outputting the pressured chemical liquid to the filter chamber 113. After passing through the filter, the chemical liquid flows back to the tank of the PCB manufacture device through the outlet 116. However, after a period of time, the filters in the filter chamber 113 need to be replaced by opening a top cover 115 of the filter chamber 115, and taking out the blockage filter, the chemical liquid droplets may drop out from the surface of the blockage filter. In order to prevent the chemical liquid from dropping onto the magnetic drive pump 12, a motor guard 123 is used. In practice, the main frame 114 has a limit in height, and the height of the outlet 116 must be matched up to the height of an inlet pipe of the tank of the PCB manufacture device. As a result, the motor guard 123 can not completely cover all metal components of the magnetic drive pump 12, for example, the bracket 124 in FIG. 1 is made of cast iron, and the motor guard 123 interferes with the tank exit 116 in height. Therefore, chemical liquid may drop onto and then corrode the bracket.

In view of the above, it is learned that the permanent magnet canned motor pump with the size of inlet and outlet of the pump meets a standard, it will have shorten the longitudinal length than the magnetic pump, and with this feature is easier installed inside the manufacture device. Besides, the area onto which chemical liquid may drop is reduced as well. However, demand for preventing the corrosion caused by the chemical liquid remains because the problem of the dropping chemical liquid can only be improved but can not be rooted out, furthermore, operator's oversight which causes the chemical liquid to drop out is unpredictable. Accordingly, the inventors recognize following problems needed to be overcome.

Problem 1: the heat dissipation of the motor.

Although the reinforced bracket made of corrosion resistance plastic can prevent the problem of the corrosion caused by the chemical liquid, the reinforced bracket also causes difficulties in arranging the cooling fins of the outer shell. Accordingly, a new heat dissipation mechanism for the motor is needed. The permanent magnet motor featuring in the high efficiency, which is higher than IE3 efficiency class of IEC60034-30 standard, can bring about dramatic reduction in the loading of heat dissipation, but the problem still remains.

Problem 2: the permeation of the chemical liquid.

The aluminum alloy motor casing of the '391 is connected to the pump casing and presses against the flange of the containment shell for preventing the leakage of the chemical liquid. However, the chemical liquid drops on the motor casing may permeate through the thread of the screw bolt into the tapped hole of the front flange of the motor casing. After that, the chemical liquid in the tapped hole may corrode and penetrate the aluminum alloy motor casing, and then the windings stator may be corroded.

The improvement of the invention can prevent middle-size and small-size permanent magnet canned motor pumps from the problem of corrosion of the dropping chemical liquid with reasonable cost. And the problem of the heat dissipation is overcome as well due to the improvement. As a result, the permanent magnet canned motor pump of the invention is more suitable for being assembled in manufacture device with confined interior space.

SUMMARY OF THE INVENTION

One of the objects of the invention is to prevent the corrosion from the chemical liquid to the components of a permanent magnet canned motor pump with a corrosion-protection housing, thereafter, called the canned pump, the corrosion-protection housing is comprised of an aluminum alloy motor casing, thereafter, called the motor casing, an aluminum alloy motor rear casing, thereafter, called the motor rear casing, and a reinforced bracket made of corrosion resistance plastic, and the permanent magnet motor of the canned pump, thereafter, called the canned motor; has the aluminum alloy motor casing and the aluminum alloy motor rear casing, thereafter, called the motor shell; and another object is to find a solution to the heat dissipation problem of the motor.

First, the followings are the solution to the problem of corrosion of the chemical liquid to the components of the motor shell.

The corrosion-protection housing protects the motor shell by taking advantage of the reinforced bracket. The shape of the reinforced bracket is a column with opening at both ends. The reinforced bracket is for preventing the corrosion of the dropping chemical drops onto the motor shell, although such material limits the heat dissipation ability of the motor shell. The bottom part of the reinforced bracket is a blanket foot plate which used to install the canned pump. A front flange of the corrosion-protection housing is formed by a bracket front flange of the reinforced bracket and a pump side flange of the motor casing, and tapped holes are formed on the front flange for tightly combining to the pump casing by bolt screws, and the front flange is pressed by the bolt screws to against the pump casing. And a shell flange of the containment shell for sealing and for preventing the leakage of corrosive liquid from the canned pump, is pressed by the front flange at back side, an o-ring is disposed on the front flange surface for protecting the windings stator in the motor casing. A sealing gasket may be located on a verge of the bracket front flange for preventing permeation of the dropping corrosive drops to the motor casing and the bolt screws, and therefore, preventing the permeation of the chemical liquid through the gaps between the bolt screws and tapped holes or through the thread of the bolt screws.

The following is the process of assembling the canned motor. First, an inner space of the reinforced bracket is divided by a ring rib into a front inner space and a rear inner space, the windings stator of the canned motor is fixed in the motor casing, then the motor casing is put in the front inner space, and the motor rear casing is put in the rear inner space. The motor casing and the motor rear casing are tied together by bolt screws, and the ring rib in the reinforced bracket is between them fixed from two opposite sides, and positioning blocks on the ring rib are inserted in fixing slots of the motor casing, so that, the corrosion-protection housing are combined as a complete unit as the corrosion-protection housing. A power transmission line for the windings is electrically connected to terminals of a terminal box of the motor rear casing. After that, an impeller and an inner rotor are combined as a complete unit and are put in the inner space of the containment shell. Finally, the front flange is tightly combined to the pump case, and is pressed and seals against the shell flange of the containment shell.

Second, the heat dissipation mechanism for the motor is described as following.

The key factor of the heat dissipation mechanism for the motor is that heat generated by the windings stator is transferred to the cooling fins without reducing the heat transfer rate, and that the cooling fins have sufficient surface and space for heat dissipation. Some embodiments of the invention take advantage of the thermal conductivity of the aluminum alloy which is as high as four times the thermal conductivity of the magnetic steel sheet. When the heat generated by the windings stator is transferred outward in a radial direction through yokes of the stator, the thermal conductivity of the contact surface, between the stator and the motor casing, will reduce by the surface roughness and the insulating vanish. So, the radial cross section area of the motor casing is similar as one fifth of the outer surface area of the lamination of the magnetic steel sheets of the stator. In other words, the cross section of the motor casing is able to transfer heat in longitude direction from the silicon steel plate with lower thermal resistance. And the longitudinal length of the motor casing is short, so that has small differential temperature between the outer surface of the magnetic steel sheets lamination and the rear end of the motor casing, that is, the heat generated by the stator is able to be transferred to the rear end of the motor casing smoothly. The cup shaped structure of the motor casing has a big contact surface adapted to transfer heat to the motor rear casing, and area of the contact surface is equal to or bigger than the radial sectional area of the motor casing; the shape of the motor rear casing is a circular disc, and the shaft rear metal support is at the center of the motor rear casing and protrudes inward. The vertical cooling fins and the terminal box of the motor rear casing, which have sufficient heat dissipation surfaces are located in the outer side for dissipating heat to the air by nature convection smoothly without accumulation of heat therein.

A bracket rear end of the reinforced bracket has a circular opening, of which the upper portion, the upper cover plate, is longer than the lower portion, the edge of the cross section of the circular opening is an arc, the lower portion of the circular opening exposes the lower portions of the cooling fins, so that air with relative low temperature enters the narrow space between the cooling fins, the air absorbs heat from the surfaces and floats upward from the lower portion of the cooling fins to the upper portion of the cooling fins due to the nature convection, and then the hot air flows out from the top portion of the rear end of the reinforced bracket. The lower circular opening is adapted to electrically connect the terminal box to the power transmission line; the upper cover plate covers the rear portions of the terminal box and the cooling fins; and the height of the lower circular opening reaches the lower portion of the terminal box to protect the cooling fins and the terminal box.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE INVENTION

The detailed features and advantages of the disclosure are described below in great detail through the following embodiments, the content of the detailed description is sufficient for those skilled in the art to understand the technical content of the present disclosure and to implement the disclosure hereof. Based upon the content of the specification, the claims, and the drawings, those skilled in the art can easily understand the relevant objectives and advantages of the disclosure.

Figure 2:
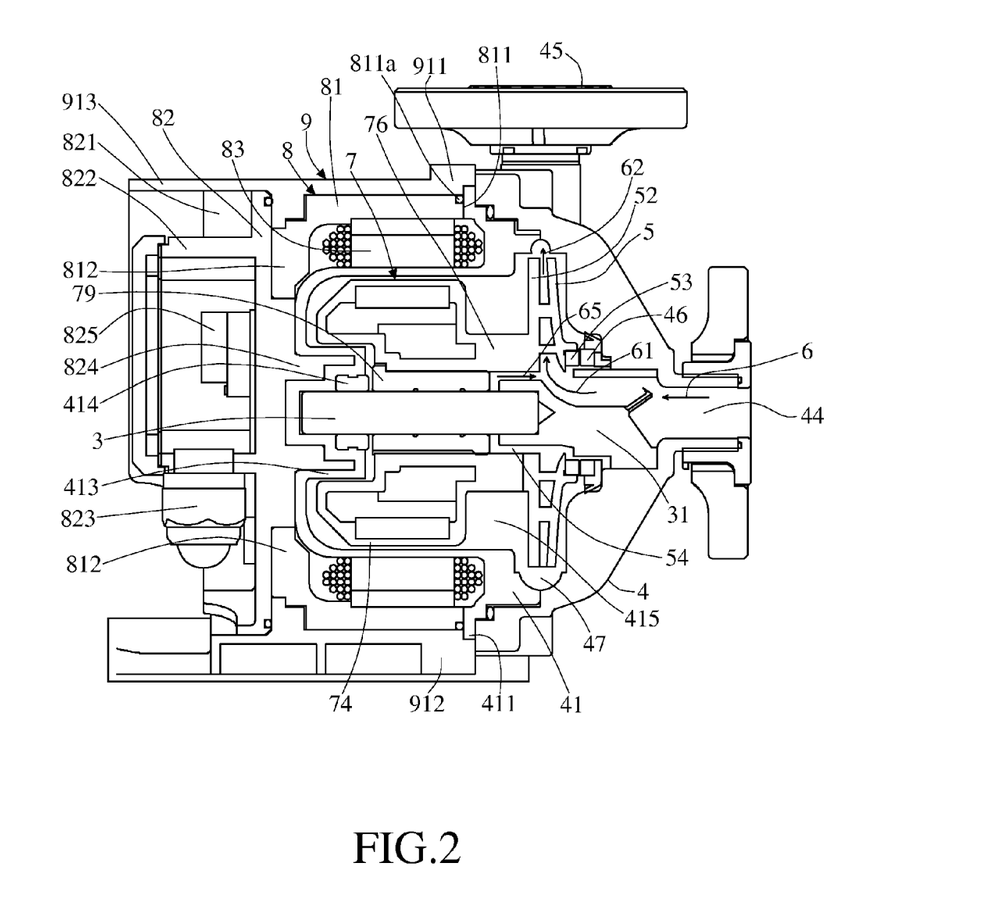
FIG. 2 is an embodiment of a permanent magnet canned motor pump with a corrosion-protection housing according to an embodiment of the invention.

Refer to FIG. 2, which is an embodiment of a permanent magnet canned motor pump, thereafter, called the canned pump, with a corrosion-protection housing according to an embodiment of the invention. A reinforced bracket is adapted to protect a motor casing and a motor rear casing. A pump side flange of the motor casing and a bracket front flange of the reinforced bracket together form a front flange of the corrosion-protection housing. In addition, tapped holes are formed on the reinforced bracket, there are screw nuts inside, so that screws are put in through holes on the motor casing to tightly tie the reinforced bracket and seal the shell flange of the containment shell. As a result, the leakage of corrosive liquid from the permanent magnet canned motor pump is prevented. The canned pump comprises a pump casing 4, a triangle front support 31, an impeller 5, a containment shell 41, a stationary shaft 3 and a canned motor 8.

The pump casing 4 has a flow channel 47, adapted for containing the impeller 5, an inlet 44 and an outlet 45. A front thrust ring 46 is located on an inner surface of the pump casing 4 and at a position near the inlet of the impeller 5, so that the front thrust ring 46 and a thrust bearing 53, which is near an inlet side of the impeller 5, form an axial thrust bearing together. The pump casing 4 and a bracket front flange 911 of a reinforced bracket 9 are combined together and adapted to fix to and seal a shell flange 411 of the containment shell 41.

The triangle front support 31 is fixed near the inlet of the pump casing 4, and axially passes through a hub aperture 54 of the impeller 5 for supporting an end of a stationary shaft 3.

The impeller 5 is contained in the pump casing 4. A hub plate 52 is connected to an axially extended part 76 of an inner rotor 7, so that the impeller 5 and the inner rotor 7 are integrated as a one.

The shape of the containment shell 41 is similar to a cup, of which the bottom has a blank rear shaft support 413. In addition, the containment shell 41 has no through hole and therefore, leakage of the corrosive liquid from the containment shell 41 is prevented. The shell flange 411, which is at a front end of the containment shell 41, is fitted between the pump casing 4 and the pump side flange 811 of the motor casing 81 in order to prevent the leakage of the corrosive liquid from the canned pump. The blank rear shaft support 413 is located at the center of the bottom of the containment shell, and a rear thrust ring 414 installed on the verge which is mated with a ceramic bearing 79 (shown in FIG. 4) of the inner rotor 7 to form an axial thrust bearing. The blank rear shaft support 413 is supported from the outer surface by a shaft rear metal support 824 (shown in FIG. 4) of a motor rear casing 82 which is closely attached each other.

The stationary shaft 3, which is made of corrosion-resistance and abrasion resistance ceramic material, is supported at both opposite ends. Specifically, the front end of the stationary shaft 3 is supported by the triangle front support 31; the rear end of the stationary shaft 3 is supported and fixed by the blank rear shaft support 413 reaching out axially. The middle part between the front end and the rear end mated with the ceramic bearing 79 (shown in FIG. 4) for supporting the inner rotor 7, so that the inner rotor 7 is able to rotate along the stationary shaft 3.

The canned motor 8 of the canned pump with a corrosion-protection housing comprises a windings stator 83, the inner rotor 7, a motor casing 81, the motor rear casing 82 and the reinforced bracket 9.

The windings stator 83 has windings wound around teeth (un-index in FIG. 2) and fixed in the motor casing 81. A PWM power source is connected to the windings for generating magnetic flux which interacts with the magnetic field of the inner rotor 7, so that a torque is generated to drive the rotation of the inner rotor 7, and the inner rotor 7 drives the impeller 5 to generate hydraulic power. The containment shell 41 protects the stator from corrosion caused by the corrosive liquid.

The inner rotor 7 is a ring shape structure comprising a main magnet set, a main yoke and the axially extended part 76. Besides, the inner rotor 7 is encapsulated by a corrosion resistance plastic and forms a sealed rotor resin enclosure 74 (shown in FIG. 2 and FIG. 4), which the shape is a ring and the ceramic bearing 79 (shown in FIG. 4) is installed inside. The axially extended part 76 of the inner rotor 7 is connected to the hub plate 52, so that inner rotor 7 and the impeller 5 are combined as a complete thing.

Figure 6:
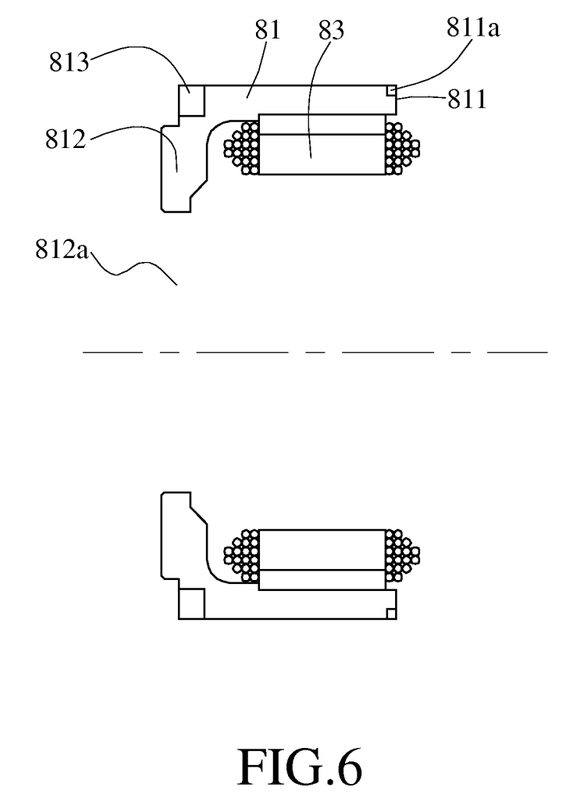
FIG. 6 is a schematic diagram f the motor casing in the FIG. 2.

The motor casing 81 is fixed to the reinforced bracket 9, the pump side flange 811 pressed against the back surface of the shell flange 411 of the containment shell. The O-ring located at flange out diameter 811a (shown in FIG. 6) of the pump side flange 811 is capable of preventing the leakage of the corrosive liquid. In the motor casing rear side 812 has a cup shaped structure with an aperture 812a (shown in FIG. 6), so that the motor casing 81 has big area to transfer heat. The cup structure with the aperture 812a is used to fix the motor rear casing 82 by screws. The thickness of the motor casing is so designed that heat can be transferred to the cooling fin 821 and the terminal box 822 of the motor rear casing 82.

The motor rear casing 82 is fixed in the reinforced bracket 9 through the cup shaped structure of the motor casing 81, and the cooling fins 821 and the terminal box 822 is capable of dissipating heat to the air through nature convection, and the shaft rear metal support 824 axially extended inward, offers strongly support to the stationary shaft 3, and the windings stator 83 are electrically connected to terminals 825 of the terminal box 822 by wire passing through the aperture 812a of the motor casing 81, the terminals 825 is connected to an electric source from the power line through a cable adaptor 823.

The reinforced bracket 9 is a column with opening at both ends, made of corrosion-resistance plastic. Tapped holes (un-index in FIG. 3) are formed on the reinforced bracket, there are screw nuts (un-shown in FIG. 3) inside, so that screws 950 (un-shown in FIG. 2) are put in through holes (un-shown in FIG. 2) on the motor casing 4 to tightly tie the reinforced bracket 9 and seal the shell flange 411 of the containment shell 41. The bracket front flange 911 is fixed to the pump casing 4 by screws 950, to build a seal face between the bracket front flange 911 and the pump casing 4, so that the chemical liquid is unable to permeate through the seal surface and enter the gap between the threads of the screws 950 and the tapped hole of the motor casing 81, which is made of aluminum ally. The sealing slot 911a (shown in FIG. 3) of the bracket front flange 911 presses against the back side of the shell flange 411 of the containment shell 41, as a result, the seal o-ring (un-index in FIG. 2) between the shell flange 411 and the pump casing 4 is compressed for preventing leakage of the corrosive liquid. In some severe conditions, a sealing gasket (non-shown on FIG. 2) may be installed on a verge of the bracket front flange 911 for preventing the corrosive drops permeate the seal faces between the bracket front flange 911 and the pump casing 4, thus to protect the screws 950 in the tapped holes free from the chemical liquid. In addition, the reinforced bracket 9 is long enough so that the rear end of the reinforced bracket 9 covers a terminal box 822 and cooling fins 821 of the motor rear casing 82.

A ring rib 916 with positioning blocks 917 (shown in FIG. 3) is located in the middle part of the inner surface of the reinforced bracket 9. The ring rib 916 divides the inner space of the reinforced bracket 9 into a front inner space 914 and a rear inner space 915 (shown in FIG. 3). The motor casing 81 is fitted in the front inner space 914, and the motor rear casing 82 is fitted in the rear inner space 915, both are tightly assembled together by screws, and the positioning blocks 917 of the ring rib 916 are inserted in the fix slot 813 (shown in FIG. 6) formed on the rear surface of the motor casing 81, so that the motor casing 81, the motor rear casing 82 and the reinforced bracket 9 are assembled as a complete unit, that is the corrosion-protection housing (shown in FIG. 5), and the canned motor 8 is supported by the blanket foot plate 912 firmly, The corrosion-protection housing is firmly mounted by a blanket foot plate 912. A front flange surface of the corrosion-protection housing is formed by a bracket front flange 911 of the reinforced bracket 9 and a pump side flange 811 of the motor casing 81. An o-ring is located in a flange out diameter 811a (shown in FIG. 2 and FIG. 6) of the pump side flange 811 of the aluminum alloy motor casing 81, is able to prevent eroding the pump side flange 811 and the windings of the stator 83. The pump side flange 811 presses against the back side of the shell flange 411 of the containment shell 41, and press an o-ring between the pump side flange 811 and the pump casing 4 for sealing and for preventing the leakage of corrosive liquid from the canned pump.

When the pump is in operation, the flowing fluid along the flow stream line 6 enters the inlet of the canned pump, and the flowing fluid along the inlet stream line 61 through the impeller 5, so that the flowing fluid out of the impeller 5 is pressurized, then, the pressurized fluid discharged through the outlet 45. In addition, a small portion of the flowing fluid is along the flow stream line 62, along the impeller exit & turn back, then passes through the back of the impeller 5, and then enters an inner space 415 of the containment shell 41. After that, the flowing fluid in inner space 415 flows to the bottom of the containment shell 41 through the gap between the outer surface of the inner rotor 7 and the inner surface of the containment shell 41, and then flows through the gap between the stationary shaft 3 and the ceramic bearing 79, finally, the fluid flows out turn back to the inlet of the impeller 5 through the hub aperture 54, shown as the stream line 65. The fluid in such loop lubricates the ceramic bearing 79 and takes away the heat generated by the inner rotor 7.

Figure 3:
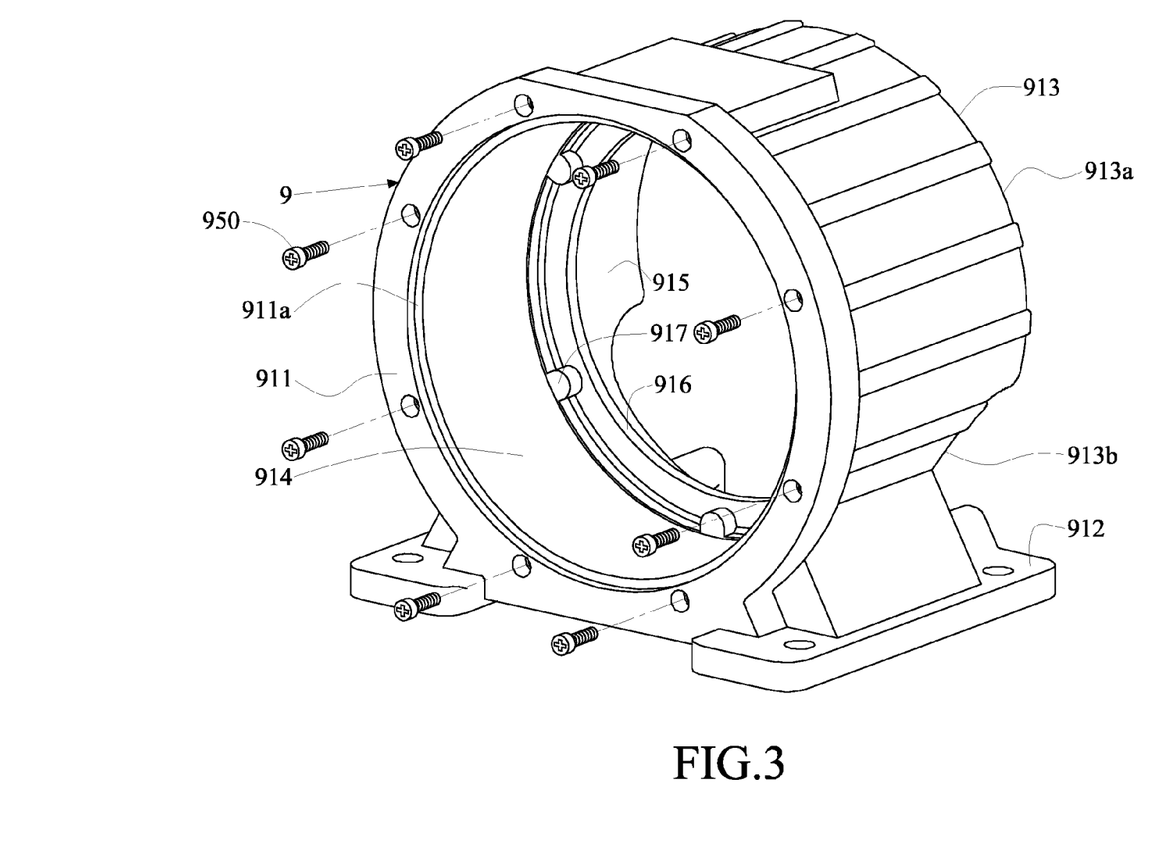
FIG. 3 is a schematic diagram of the reinforce bracket in the FIG. 2.

Refer to FIG. 3 which is a 3D diagram of the reinforced bracket 9 in the FIG. 2. The reinforced bracket 9 is a column with opening at both ends, which is made of corrosion-resistance plastic, the bracket front flange 911 with the sealing slot 911a is at one end, the blanket foot plate 912 which is a flat plate at the bottom part, and the ring rib 916 with the positioning blocks 917 is located in the middle of the inner surface, also the ring rib 916 divides the inner space of the reinforced bracket 9 into the front inner space 914 and the rear inner space 915, and the motor casing 81 (shown in FIG. 2) is fitted in the front inner space 914, the motor rear casing 82 (shown in FIG. 2) is fitted in the rear inner space 915. The reinforced bracket 9 includes a bracket rear end 913 with a lower circular open 913b (shown in FIG. 5), and the lower portion of the cooling fins 821 (shown in FIG. 5) of the motor rear casing 82 (shown in FIG. 5) is exposed. The bracket rear end 913 further comprises an upper cover plate 913a cover the rear ends of both the terminal box 822 (shown in FIG. 5) and the cooling fins 821. Besides, the height of the lower circular open 913b (shown in FIG. 5) reaches the lower portion of the terminal box 822, so that the cooling fins 821 (shown in FIG. 5) and the terminal box 822 (shown in FIG. 5) are protected.

Figure 4:
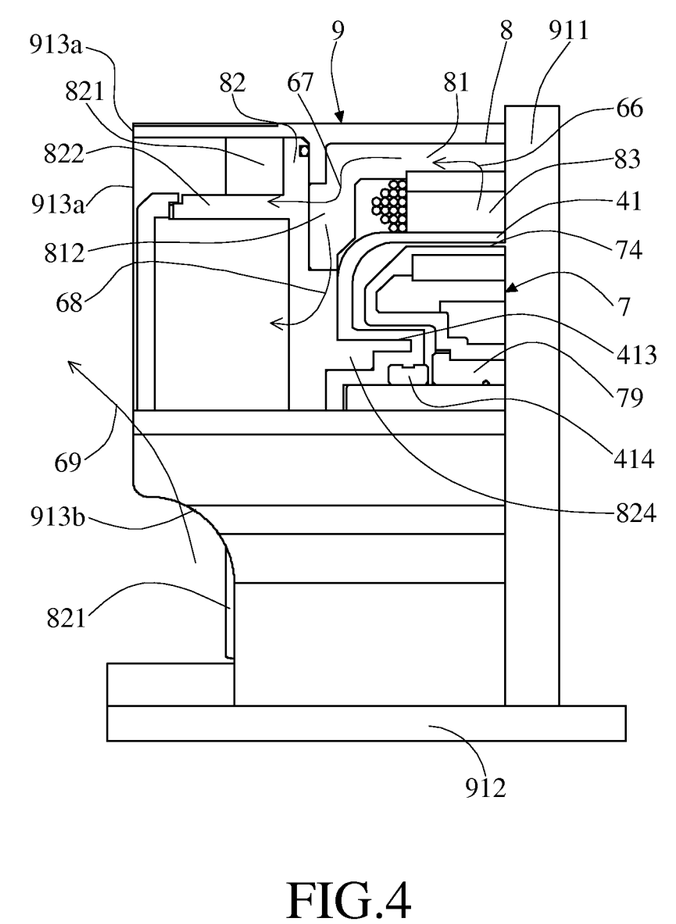
FIG. 4 is a schematic diagram of heat dissipation path of the canned motor.
Figure 5:
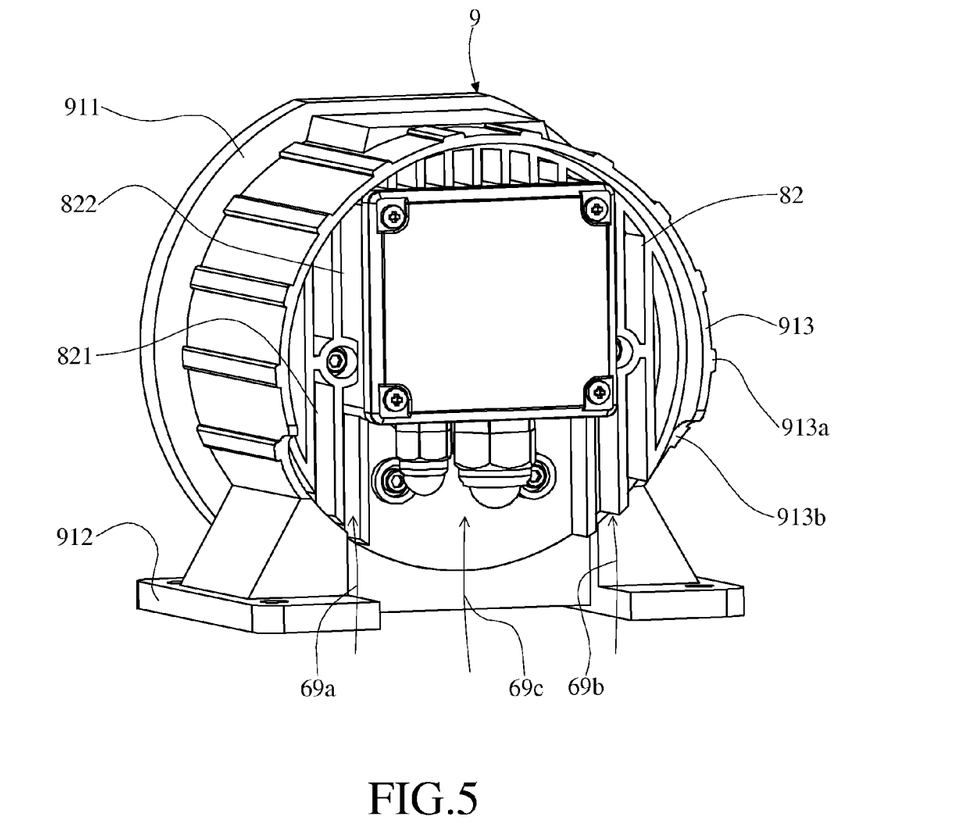
FIG. 5 is a schematic diagram of the cooling fins in FIG. 2.

Refer to FIGS. 4 and 5, which are schematic diagrams of heat dissipation path and the cooling fins of the canned motor. Specifically, the FIG. 4 is a sectional view of the canned motor 8 for illustrating the heat conduction mechanism and the function of the cooling fins 821. While the heat generated by the windings stator 83 is transferred outward in a radical direction from the tooth and through the yoke of the windings stator 83, the heat is first transferred to the motor casing 81 shown as the heat transfer path 66 from the stator. The thermal conductivity of the contact surface between the stator 83 and the motor casing 81 will little reduce by the surface roughness and the insulating vanishes. The radial cross section area of the motor casing 81 is no less than one fifth of the outer surface area of the lamination of the magnetic steel sheets of the stator 83. In other words, the radial cross section area of the motor casing 81 is able to transfer heat in longitude direction from the lamination of the magnetic steel sheets with lower thermal resistance. The longitudinal length of the motor casing 81 is short, so that has small differential temperature between the outer surface of the magnetic steel sheets lamination and the rear end of the motor casing 81, shown as the heat transfer path 67 from the motor casing. In addition, the cup shaped structure of the motor casing 81 in the motor casing rear side 812 has a big contact surface which is equal to or bigger than 1.5 times the radial sectional area of the motor casing 81, so that heat is easily transferred to the motor rear casing 82, shown as the heat transfer path 68 to the cooling fines. The cooling fins 821 and the terminal box 822 of the motor rear casing 82 have sufficient heat dissipation surfaces and protrude outward. The sum of the areas of the heat dissipation surfaces of the cooling fins 821 and the terminal box 822 is above four times the area of the outer surface of the stator 83, so that heat can be dissipated to the air by nature convection smoothly without accumulation of heat therein, shown as nature convection flow streamline 69.

In addition to the sufficient heat dissipation surfaces, the nature convection velocity is another important factor as well. The lower circular open 913b of the rear end of the reinforced bracket 9 exposes the lower portion of the cooling fins 821 of the motor rear casing 82, so that it is easy for the air with relative low temperature floating over the surface of the cooling fins 821 to absorb heat due to the nature convection. Then, the hot air flows out from the top portion of the rear end of the reinforced bracket 9, shown as the nature convection flow streamlines 69a, 69b and 69c.

What is claimed is:

1. A permanent magnet canned motor pump with a corrosion-protection housing, in a high temperature, toxic, flammable and corrosive liquid transferred application, comprising a pump casing, a triangle support, an impeller, a containment shell, a stationary shaft and a canned motor, wherein the pump casing has a flow channel, adapted for containing the impeller, an inlet, an outlet, and a front thrust ring, the front thrust ring being located on an inner surface of the pump casing and at a position near the inlet; so that the front thrust ring and a thrust bearing, which is near an inlet side of the impeller, form an axial thrust bearing together;

the triangle support is fixed inside the inlet of the pump casing, and axially passes through a hub aperture of the impeller for supporting an end of the stationary shaft;

the impeller is contained in the pump casing, a hub plate is connected to an axially extended part of an inner rotor, so that the impeller and the inner rotor of the canned motor are integrated as one unit;

the containment shell is similar to a cup shape, of which at the center of a bottom has a blank rear shaft support axially extending inward, an outer surface of the blank rear shaft support being supported by a shaft rear metal support of a motor rear casing, the blank rear shaft support and the shaft rear metal support are closely attached to each other; and a rear thrust ring is installed on the verge of the blank rear shaft support and is mated with a ceramic bearing of the inner rotor to form the axial thrust bearing; a shell flange, which is at a front end of the containment shell, is fitted between the pump casing and a front flange of the corrosion-protection housing in order to prevent leakage of the corrosive liquid from the permanent magnet canned motor pump;

the stationary shaft, which is made of corrosion-resistant and abrasion-resistant ceramic material, is supported at both opposite ends, a front end of the stationary shaft is supported by the triangle support, a rear end of the stationary shaft is supported and fixed by the blank rear shaft support; a middle part between the front end and the rear end is mated with the ceramic bearing for supporting the inner rotor, so that the inner rotor is able to rotate along the stationary shaft;

the canned motor of the permanent magnet canned motor pump with the corrosion-protection housing comprises a windings stator, the inner rotor, a motor casing, the motor rear casing, and a reinforced bracket;

the windings stator inserted inside the motor casing has windings wound around teeth of the windings stator, a torque is generated from a magnetic interaction between the inner rotor and the windings stator to drive the rotation of the inner rotor, and the inner rotor drives the impeller to rotate and generate hydraulic power, the containment shell protects the windings stator from corrosion caused by the corrosive liquid;

the inner rotor is a ring-shape structure comprising a main magnet set, a main yoke and the axially extended part; the inner rotor is encapsulated by a corrosion resistant plastic and forms a sealed rotor resin enclosure, and the ceramic bearing is installed inside the inner rotor; the axially extended part of the inner rotor is connected to the hub plate, so that the inner rotor and the impeller are combined as a complete unit;

a rear side of the motor casing is a cup shaped structure with an aperture, and the windings stator is inserted inside;

the motor rear casing is circular-disc shaped having vertical cooling fins, a terminal box and the shaft rear metal support; the shaft rear metal support is axially extended inward through the aperture of the motor casing to offer support to the stationary shaft; and the windings stator are electrically connected to terminals of the terminal box by wire passing through the aperture; and the reinforced bracket is a column with an opening at both ends, made of corrosion resistance plastic, a bottom part of the reinforced bracket is a blanket foot plate which is a flat plate; the reinforced bracket comprises a ring rib dividing an inner space of the reinforced bracket into a front inner space and a rear inner space; the motor casing fitted in the front inner space and the motor rear casing fitted in the rear inner space are combined as a complete unit as the corrosion-protection housing, which features:

the front flange of the corrosion-protection housing is formed by a bracket front flange of the reinforced bracket and a pump side flange of the motor casing; and tapped holes are formed on the front flange for tightly combining to the pump casing, and the front flange is against a back side of the shell flange of the containment shell for sealing and for preventing the leakage of corrosive liquid from the permanent magnet canned motor pump; a front end of the reinforced bracket pressing against the pump casing is adapted to prevent permeation of chemical drops; the corrosion-protection housing is mounted by a blanket foot plate of the reinforced bracket; in addition, the reinforced bracket is long enough so that a rear end of the reinforced bracket covers the terminal box and the cooling fins of the motor rear casing.

2. The permanent magnet canned motor pump with the corrosion-protection housing as claimed in claim 1, wherein the tapped holes formed on the bracket front flange are for tightening the pump casing by bolt screws, and the bracket front flange is pressed by the bolt screws against the pump casing and at the back side of the shell flange of the containment shell for sealing, and to prevent the permanent magnet canned motor pump from the leakage of corrosive liquid.

3. The permanent magnet canned motor pump with the corrosion-protection housing as claimed in claim 1, wherein the motor casing and the motor rear casing are fitted inside the inner space and tied by bolt screws, the reinforced bracket further comprises positioning blocks disposed on the ring rib and inserted in fixing slots of the motor casing.

4. The permanent magnet canned motor pump with the corrosion-protection housing as claimed in claim 1, wherein a sealing gasket is located on a bracket front flange of the reinforced bracket for pressing against the pump casing to prevent permeation of the corrosive liquid through a seal surface to enhance the corrosion-protection function.

5. The permanent magnet canned motor pump with the corrosion-protection housing as claimed in claim 1, wherein the rear end of the reinforced bracket has a circular opening with an upper portion and a lower portion, the upper portion of the circular opening is longer than the lower portion of the circular opening, an edge of a cross section of the circular opening is an arc, the lower portion of the circular opening exposes a lower portion of the cooling fins, the lower portion of the circular opening is adapted to electrically connect the terminal box to a power transmission line; an upper circular cover plate covers rear portions of the terminal box and the cooling fins, and a height of the lower portion of the circular opening reaches a lower portion of the terminal box to protect the cooling fins and the terminal box.

6. The permanent magnet canned motor pump with the corrosion-protection housing as claimed in claim 1, wherein the motor casing is fitted in the reinforced bracket and an O-ring located at the pump side flange of the motor casing is capable of preventing permeation of the corrosive liquid.

7. The permanent magnet canned motor pump with the corrosion-protection housing as claimed in claim 1, wherein the bracket front flange has a sealing slot for receiving an o-ring for preventing permeation of the corrosive liquid.

8. The permanent magnet canned motor pump with the corrosion-protection housing as claimed in claim 1, wherein the pump side flange of the motor casing is against the back side of the shell flange of the containment shell and presses an o-ring between the pump casing and the shell flange to prevent the permanent magnet canned motor pump from leakage.

9. A permanent magnet canned motor pump with a corrosion-protection housing, —in high temperature, toxic, flammable and corrosive liquid transferred applications, components related to a heat dissipation mechanism of the canned motor comprising a windings stator, a motor casing, a motor rear casing, and a reinforced bracket, wherein the windings stator comprises a yoke and a plurality of teeth, when heat is generated by the windings stator and transmitted outward in a radial direction from the teeth of the windings stator through the yoke of the windings stator, the heat is first transmitted to the motor casing;

a rear side of a bottom of a cup shaped structure of the motor casing has a contact surface, adapted to transfer heat to the motor rear casing;

the motor rear casing is circular-disc shaped and is for transferring heat through the bottom of the motor casing, and a plurality of vertical cooling fins and a surface of a terminal box dissipate heat to an outside of the permanent magnet canned motor pump by natural convection; and a bracket rear end of the reinforced bracket has a circular opening with an upper portion and a lower portion, the upper portion of the circular opening is longer than the lower portion of the circular opening along an axial direction, an edge of a cross section of the circular opening is an arc, the lower portion of the circular opening exposes a lower portion of the cooling fins, so that air enters a narrow space between the cooling fins, the air absorbs heat from surfaces of the cooling fins and floats upward from the lower portion of the cooling fins to an upper portion of the cooling fins due to natural convection, and then hot air flows out from a top portion of the bracket rear end of the reinforced bracket; the reinforced bracket is long enough so that the bracket rear end of the reinforced bracket covers the terminal box and the vertical cooling fins of the motor rear casing.

10. The permanent magnet canned motor pump with the corrosion-protection housing as claimed in claim 9, wherein a radial cross sectional area of the motor casing is no less than one fifth of an outer surface area of the lamination of magnetic steel sheets of the windings stator.

11. The permanent magnet canned motor pump with the corrosion-protection housing as claimed in claim 9, wherein a total area of the vertical cooling fins and the terminal box of the motor rear casing is four times-greater than an outer surface area of the lamination of magnetic steel sheets of the windings stator.

12. The permanent magnet canned motor pump with the corrosion-protection housing as claimed in claim 9, wherein the contact surface of the cup shaped structure of the motor casing is equal to or bigger than a radial cross sectional area of the motor casing.

* * * * *